(12) United States Patent
Nabeshima et al.

(10) Patent No.: US 7,092,124 B2
(45) Date of Patent: Aug. 15, 2006

(54) IMAGE PROCESSING APPARATUS, IMAGE FORMING APPARATUS, AND IMAGE PROCESSING METHOD WITH JUDGING PIXELS IN HALFTONE-DOT AREAS BASED ON ISOLATED PIXEL COUNTS

(75) Inventors: Takayuki Nabeshima, Toyokawa (JP); Hiroyuki Suzuki, Toyokawa (JP); Terukazu Ishiguro, Aichi-Ken (JP)

(73) Assignee: Minolta Co., Ltd., Osaka (JP)

( * ) Notice: Subject to any disclaimer, the term of this patent is extended or adjusted under 35 U.S.C. 154(b) by 1085 days.

(21) Appl. No.: 10/084,914

(22) Filed: Mar. 1, 2002

(65) Prior Publication Data

US 2002/0122195 A1   Sep. 5, 2002

(30) Foreign Application Priority Data

Mar. 2, 2001   (JP)   ............................. 2001-059079

(51) Int. Cl.
H04N 1/405 (2006.01)
H04N 1/409 (2006.01)
G06T 7/00 (2006.01)

(52) U.S. Cl. ..................... 358/1.9; 358/3.06; 358/3.12; 358/3.26; 382/194; 382/205

(58) Field of Classification Search .................. 358/1.9, 358/2.1, 3.06, 3.09, 3.12, 3.26, 534, 462; 382/194, 205, 190, 173

See application file for complete search history.

(56) References Cited

U.S. PATENT DOCUMENTS 5,721,793 A * 2/1998 Ushida et al. .............. 382/300
5,832,141 A * 11/1998 Ishida et al. ................ 358/462
5,995,658 A * 11/1999 Hanyu ......................... 382/176
6,707,951 B1 * 3/2004 Suzuki et al. ............... 382/260
6,775,031 B1 * 8/2004 Fujiwara ...................... 358/2.1
6,868,180 B1 * 3/2005 Akahori et al. ............ 358/3.06

FOREIGN PATENT DOCUMENTS

| JP | 05-153393 | 6/1993 |
|----|-----------|--------|
| JP | 09-247436 | 9/1997 |
| JP | 11-266360 | 9/1999 |
| JP | 2000-59615 | 2/2000 |
| JP | 2000-287077 | 10/2000 |
| JP | 2000-333014 | 11/2000 |

OTHER PUBLICATIONS

U.S. Appl. No. 09/369,176.
U.S. Appl. No. 09/568,669.

* cited by examiner

*Primary Examiner*—Scott A. Rogers
(74) *Attorney, Agent, or Firm*—Buchanan Ingersoll PC (57) ABSTRACT

Disclosed are an image processing apparatus that can decrease image quality deterioration caused by misjudgment of a halftone-dot area when its resolution is beyond an appropriate range etc., in the case where judgment of a halftone-dot area is based on the number of isolated pixels present in a predetermined area, and an image forming apparatus that utilizes the image processing apparatus. A white isolated pixel detection unit 442 (and a black isolated pixel detection unit) includes a plurality of filters 4421 and 4422 that each can detect an isolated pixel in a halftone-dot of a different size. When output is made indicating that a target pixel is an isolated pixel detected by at least one of the filters, the target pixel is judged to be an isolated pixel.

13 Claims, 11 Drawing Sheets

FIG.1

| V11 | V12 | V13 | V14 | V15 |
|-----|-----|-----|-----|-----|
| V21 | V22 | V23 | V24 | V25 |
| V31 | V32 | V33 | V34 | V35 |
| V41 | V42 | V43 | V44 | V45 |
| V51 | V52 | V53 | V54 | V55 |

| V11 | V12 | V13 | V14 | V15 | V16 | V17 |
|-----|-----|-----|-----|-----|-----|-----|
| V21 | V22 | V23 | V24 | V25 | V26 | V27 |
| V31 | V32 | V33 | V34 | V35 | V36 | V37 |
| V41 | V42 | V43 | V44 | V45 | V46 | V47 |
| V51 | V52 | V53 | V54 | V55 | V56 | V57 |
| V61 | V62 | V63 | V64 | V65 | V66 | V67 |
| V71 | V72 | V73 | V74 | V75 | V76 | V77 |

IMAGE PROCESSING APPARATUS, IMAGE FORMING APPARATUS, AND IMAGE PROCESSING METHOD WITH JUDGING PIXELS IN HALFTONE-DOT AREAS BASED ON ISOLATED PIXEL COUNTS

This application is based on Patent Application No. 2001-59079 filed in Japan, the content of which is hereby incorporated by reference.

BACKGROUND OF THE INVENTION

1 Field of the Invention

The present invention relates to an image processing apparatus, and particularly to a technique for decreasing deterioration of image quality in an image forming apparatus that forms an image based on digital image data.

2 Description of Related Art

In image forming apparatuses that form an image based on digital image data, various image processing such as smoothing and edge enhancement is generally employed to improve image quality. Such image processing is performed on pixels of image data in accordance with an image type, examples of which include a character image and a halftone-dot image. To be more specific, a pixel that is judged to be in a halftone-dot area is typically subjected to smoothing, and a pixel that is judged to be in an edge area of a character is typically subjected to edge enhancement.

Here, the following describes an example of a method for judging whether each of pixels included in image data is in a halftone-dot area or not, disclosed in the Japanese published unexamined application 2000-59615. Each pixel is set as a target pixel to be judged, and the first judgment is performed as to whether the target pixel is an isolated pixel or not, using a filter with a size of 5*5 pixels. Then, the second judgment is performed as to whether the target pixel is in a halftone-dot area or not, by counting the number of isolated pixels present in a predetermined area including the target pixel. According to this method, an isolated pixel detection filter is used in the first judgment, an example of which is a filter with a size of 5*5 pixels shown in FIG. 1. Brightness data of each pixel is made to pass through this isolated pixel detection filter, and the judgment is performed as to whether the target pixel is an isolated pixel, by judging whether the relationship between brightness of the target pixel "V33" and brightness of nearby pixels satisfies a predetermined condition.

Following this, the second judgment as to whether the target pixel is in a halftone-dot area is performed, by counting the number of isolated pixels present in a predetermined area such as an area consisting of 9 (vertical)*45 (horizontal) pixels. To be more specific, when the count number of isolated pixels is above a predetermined threshold, the target pixel is judged to be in a halftone-dot area.

However, the above conventional image processing apparatuses have the problem that a judgment of a halftone-dot area may not be performed correctly due to resolution of a halftone-dot area or due to the existence of a character in a halftone-dot area.

Here, the following briefly describes the meaning of the term "resolution" of a halftone-dot image. For a halftone-dot image, resolution can be defined by the number of halftone-dots present in a predetermined area. Density (gradation) of the halftone-dot area depends on a total area occupied by a plurality of halftone-dots included therein. In general, when two halftone-dot images with different resolution have the same density, the halftone-dot image with lower-resolution (where a distance between the center of one halftone-dot to the center of an adjacent halftone-dot is larger) includes halftone-dots of a larger size, and the halftone-dot image with higher-resolution (where a distance between the center of one halftone-dot to the center of an adjacent halftone-dot is smaller) includes halftone-dots of a smaller size.

Figure 1:
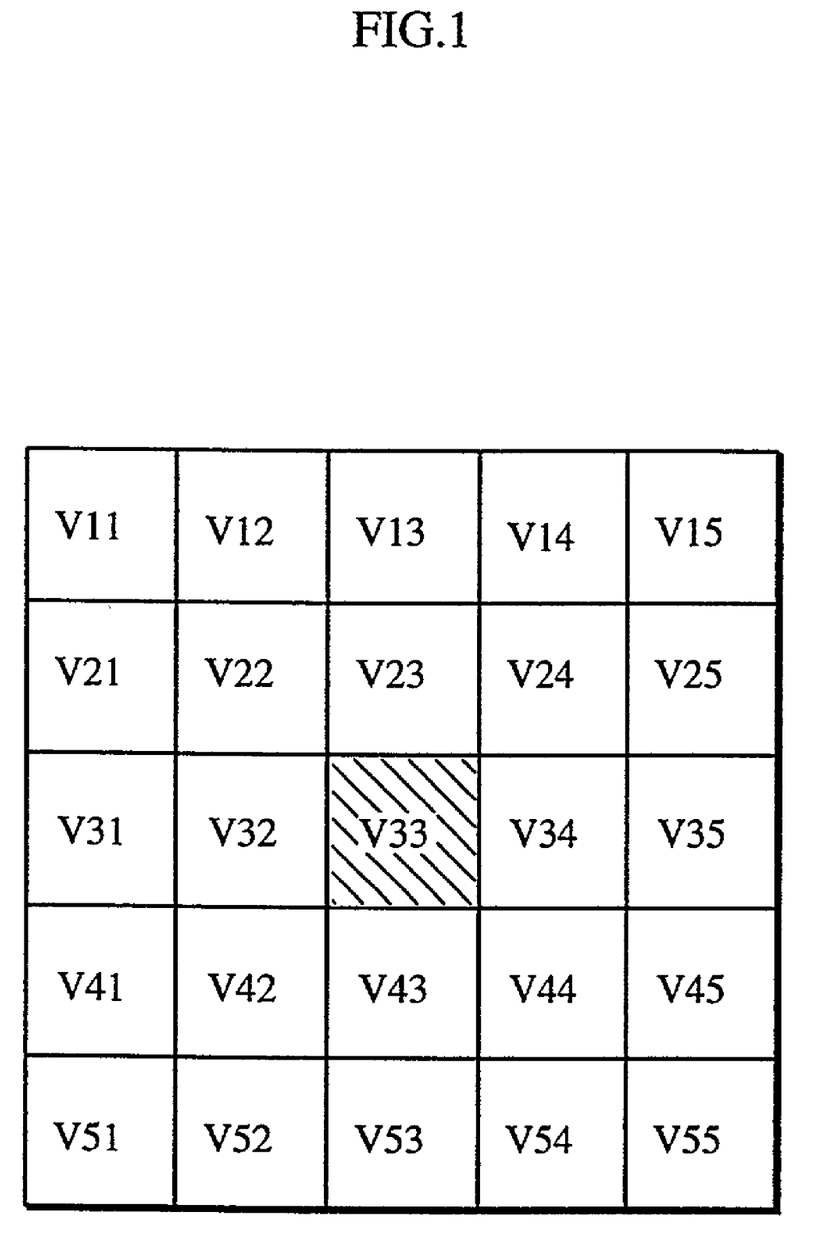
FIG. 1 shows an example case showing an isolated pixel detection filter with a size of 5*5 pixels including a target pixel "V33"
Figure 2:
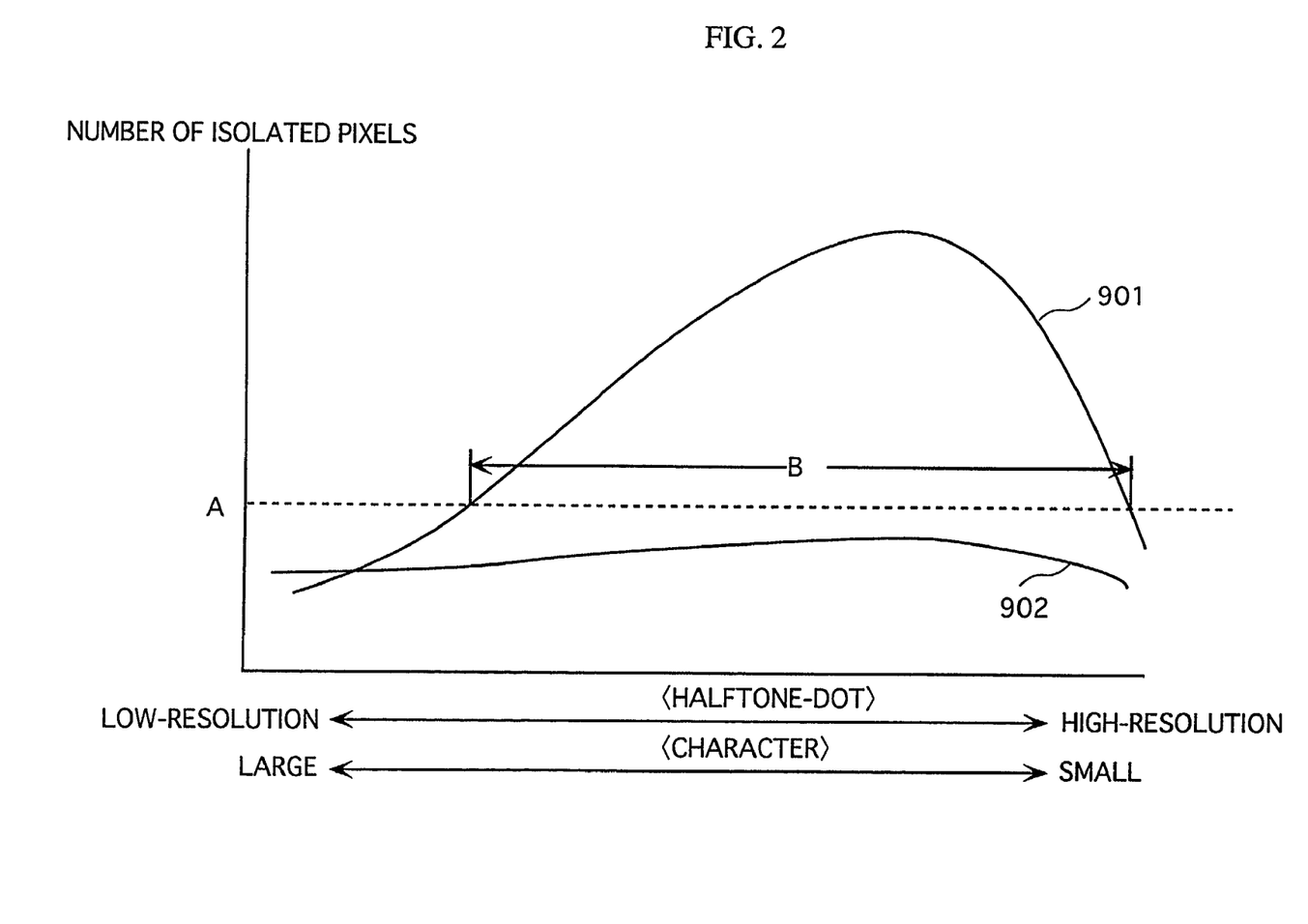
FIG. 2 is a drawing for explaining a case where a halftone-dot area cannot be judged correctly in a conventional image processing apparatus.

The following describes the problem, with reference to FIG. 2. In the figure, the horizontal axis indicates resolution of a halftone-dot area, or a size of a character, and the vertical axis indicates the number of isolated pixels to be detected by the method using the isolated pixel detection filter shown in FIG. 1. A curve 901 indicates the relationship between resolution of a halftone-dot area and the number of isolated pixels to be detected, in the case of a halftone-dot image. A curve 902 indicates the relationship between a size of a character and the number of isolated pixels to be detected, in the case of a character image.

Assuming the number of isolated pixels "A" to be a threshold for a judgment of a halftone-dot image, a halftone-dot area can be judged correctly as a halftone-dot area in a range "B" in the figure. However, beyond the range "B", i.e., when a halftone-dot is smaller than the size range "B", a halftone-dot area cannot be judged correctly as a halftone-dot area.

If a halftone-dot area is not judged correctly as described above, image processing suitable for a halftone-dot area, an example of which is smoothing, may not be performed appropriately. This may cause image quality to deteriorate.

On the other hand, when a character is present in a halftone-dot area, pixels constituting a character part are not judged as isolated pixels in general. Therefore, when pixels in a halftone-dot area in a close vicinity of a character are judged, a count number of pixels judged as isolated pixels may turn out to be below a predetermined threshold. Accordingly, such a halftone-dot area may not be judged correctly as a halftone-dot area.

SUMMARY OF THE INVENTION

The object of the present invention, therefore, is to provide an image processing apparatus that can decrease misjudgment of a halftone-dot area and thereby decreasing image quality deterioration, and to provide an image forming apparatus that utilizes the image processing apparatus, and an image processing method.

The above object can be achieved by an image processing apparatus, including: an acquisition unit for acquiring image data that includes a plurality of pixels, each of which is set as a target pixel to be judged; an isolated pixel judgment unit for judging, based on the image data, whether the target pixel is an isolated pixel for a judgment of a halftone-dot area; an isolated pixel counter for counting a number of isolated pixels in a predetermined area; and a halftone-dot area judgment unit for judging whether the target pixel is in a halftone-dot area, by comparing the count number of isolated pixels with a predetermined threshold, wherein the isolated pixel judgment unit includes: a first judgment subunit for judging whether the target pixel is an isolated pixel for a judgment of a halftone-dot area whose dot size is within a first range; and a second judgment subunit for judging whether the target pixel is an isolated pixel for a judgment of a halftone-dot area whose dot size is within a second range, and the isolated pixel judgment unit judges that the target pixel is an isolated pixel, when a judgment result of at least one of the first judgment subunit and the second judgment subunit is affirmative.

According to this construction, misjudgment of a halftone-dot area can be decreased, thereby decreasing image quality deterioration.

The above object can also be achieved by an image processing apparatus, including: an acquisition unit for acquiring image data that includes a plurality of pixels, each of which is set as a target pixel to be judged; an isolated pixel judgment unit for judging, based on the image data, whether the target pixel is an isolated pixel for a judgment of a halftone-dot area; a first isolated pixel counter for counting a number of isolated pixels in a first area; a second isolated pixel counter for counting a number of isolated pixels in a second area that is smaller than the first area; and a halftone-dot area judgment unit for (a) judging whether the target pixel is in a halftone-dot area by comparing the number of isolated pixels counted by the second isolated pixel counter with a first threshold, in a first case where the number of isolated pixels counted by the first isolated pixel is within a predetermined range, and (b) judging whether the target pixel is in a halftone-dot area by comparing the number of isolated pixels counted by the first isolated pixel counter with a second threshold, in a second case that is other than the first case.

According to this construction, misjudgment of a halftone-dot area that often occurs when a character image is present in a halftone-dot area can be decreased, thereby decreasing image quality deterioration.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings.

DESCRIPTION OF THE PREFERRED EMBODIMENTS

The following describes preferred embodiments of an image processing apparatus and an image forming apparatus relating to the present invention, with reference to the drawings.

(1) Overall Construction of the Image Processing Apparatus

Figure 3:
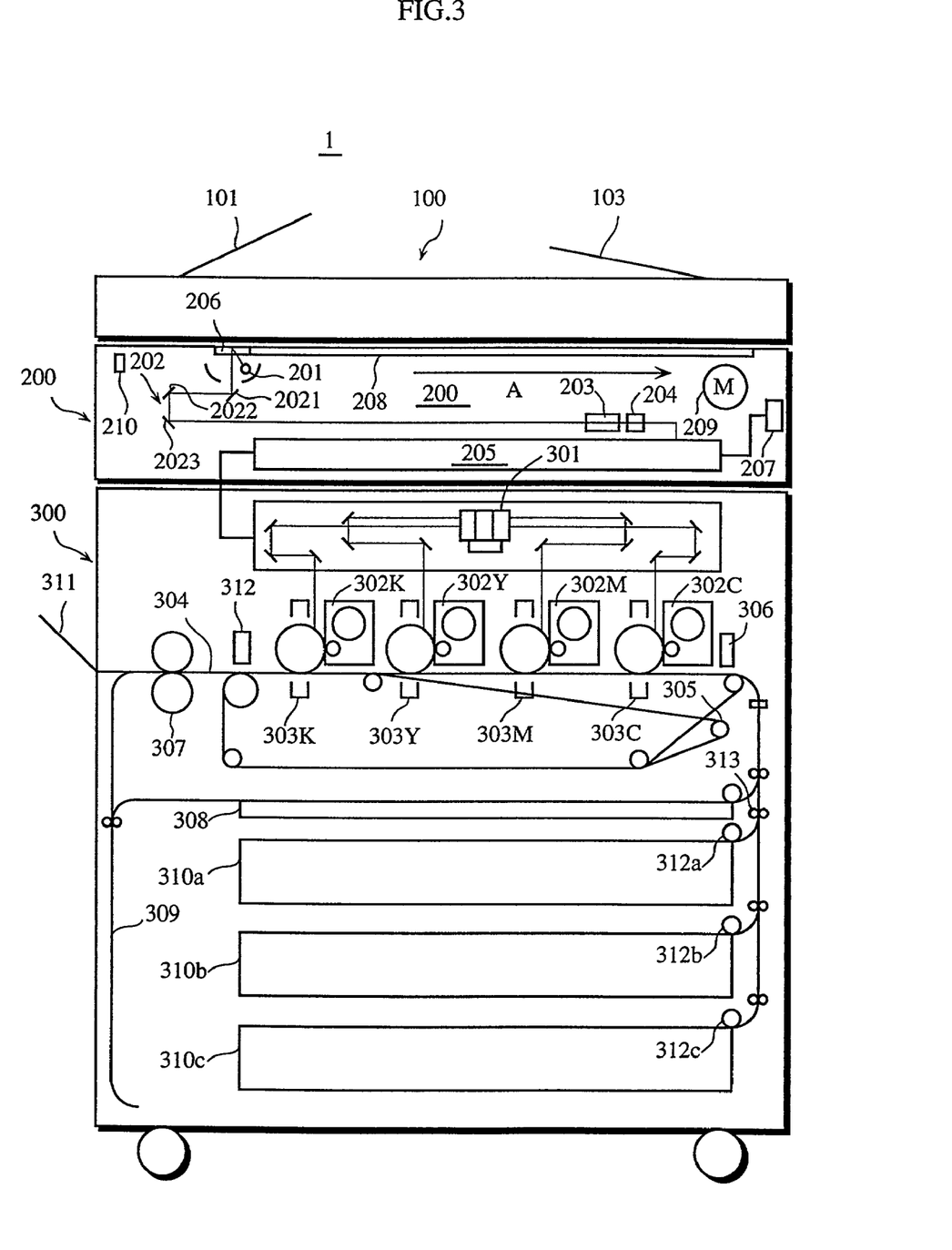
FIG. 3 is a schematic cross sectional view showing the overall construction of a copying machine 1.

FIG. 3 is a schematic cross sectional view showing the overall construction of a full-color copying machine 1 (hereafter simply referred to as a "copying machine") as one example of the image forming apparatus.

In the copying machine 1, an image forming unit 300 forms an image based on digital image data obtained by an image reading unit 200 reading a document. An automatic document feeder 100 is provided on the image reading unit 200. Here, an image is typically formed in the following way. A document is fed to an image reading position by the automatic document feeder 100 and is read by the image reading unit 200, and the obtained image data is transmitted to the image forming unit 300, which forms the image on a recording sheet. The copying machine 1 can be connected to external devices, such as a personal computer (PC), via an interface 207. This connection provides the copying machine 1 with additional features such as (a) scanner function for outputting image data read by the image reading unit 200 to an external device, and (b) printer function for receiving input of image data from an external device and forming an image by the image forming unit 300, based on the input image data.

The automatic document feeder 100 feeds a document placed on a document feed tray 101 to the image reading position of the image reading unit 200, and after the image is read, discharges the document to a document discharge tray 103. The document transportation operation is accomplished in accordance with instructions from a control panel (not shown), and the document discharge operation is accomplished in accordance with a reading end signal from the image reading unit 200. When a plurality of documents are stacked on the document feed tray 101, these control signals are continuously generated to sequentially transport the documents, read images of the documents, and discharge the documents.

In the image reading unit 200, an exposure lamp 201 illuminates the document placed on a document glass 208, and a mirror group 202 including three mirrors 2021 to 2023 and a lens 203 directs the light reflected by the document to form an image on a CCD sensor 204. The exposure lamp 201 and the first mirror 2021 are driven by a scan motor 209 in the direction of arrow A at a speed V corresponding to the magnification ratio, so as to scan the entire surface of the document placed on the document glass 208. While the document is being scanned using the exposure lamp 201 and the first mirror 2021, the second mirror 2022 and the third mirror 2023 move in the direction of arrow A at a speed V/2. The position of the exposure lamp 201 is calculated and controlled, using the amount of movement from the home position, i.e., using the number of steps of the scan motor 209 and detection signals from a scan home position sensor 210. The reflected light entering the CCD sensor 204 is converted into electric signals within the CCD sensor 204. The image processing unit 205 then subjects the electric signals to various image processing, such as analogue processing, analogue-to-digital (AD) conversion, and digital image processing, and then transmits the signals to the interface 207 or to the image forming unit 300. A white shading correction plate 206 is arranged in close proximity to the document reading start position of the document glass 208. Prior to reading of the document, the shading correction plate 206 is read to generate correction data for shading correction.

The following describes the image forming unit 300. First, exposure and imaging are described.

Image data transmitted from the image reading unit 200 or the interface 207 is converted into print data of each of colors C (cyan), M (magenta), Y (yellow), and K (black), and is transmitted to a control unit of each exposure head (not shown). The control unit of each exposure head makes a laser emit a laser beam in accordance with a pixel value of the transmitted image data, and performs a one-dimensional scan with the emitted laser beam via a polygon mirror 301, to optically expose the surface of a photoconductor in each of the imaging units 302C, 302M, 302Y, and 302K.

In each of the imaging units 302C to 302K, elements required for an electrophotographic process are arranged around the periphery of a photoconductor. The electrophotographic process is continuously performed as the photoconductor for each of C, M, Y, and K is rotated clockwise. The imaging units 302C to 302K necessary for forming an image each are integrated, and are detachable from the body. The latent images formed on the photoconductors in the imaging units 302C to 302K by the above exposure are developed by developing units of respective colors. The toner images developed on the surface of the photoconductors in the imaging units 302C to 302K are transferred onto a recording sheet transported on a paper transport belt 304, by transfer chargers 303C to 303K respectively arranged to face the photoconductors in the imaging units 302C to 302K within the paper transport belt 304.

The following describes the recording sheet feeding, transport, and fixing operations. The recording sheet onto which an image is to be transferred is fed to the transfer position in the following sequence and the image is formed on the recording sheet. Recording sheets of various sizes are loaded beforehand in paper feed cassettes 310a to 310c. A recording sheet of a desired size is fed to the transport path by a corresponding one of the paper feed rollers 312a to 312c respectively mounted on the paper feed cassettes 310a to 310c.

The recording sheet fed to the transport path is transported onto the paper transport belt 304 by a transport roller pair 313. Here, a reference mark on the paper transport belt 304 is detected by a timing sensor 306, so that a transport timing of the recording sheet is adjusted. Also, in the imaging units 302C to 302K, three registration correction sensors 312 are arranged along the main scanning direction furthest downstream in the direction of the transportation of the recording sheet. When a registration pattern is formed on the paper transport belt 304, the amount of color aberration is detected in the main scanning direction and the sub scanning direction of the C, M, Y, and K images by the registration correction sensors 312. Print image correction and image distortion correction are performed by a print image control unit (PIC unit). As a result, color aberration on the recording sheet can be prevented. The toner image transferred onto the recording sheet is fused and fixed thereon via heating by the fixing roller pair 307, and then the recording sheet is discharged to a discharge tray 311.

Note that in the case of duplex copies, an image is formed on the back side of the recording sheet in the following way. The recording sheet on which the toner image is fixed by the fixing roller pair 307 is inverted by a paper inverting unit 309, and is guided to a duplex unit 308, which re-feeds the recording sheet to the transport path. Note also that the paper transport belt 304 can be retracted from the imaging units 302C, 302M, and 302Y of colors C, M, and Y, by up-and-down movement of a belt retracting roller 305, so as not to contact the photoconductors therein. When a monochrome image is formed, therefore, the imaging units 302C, 302M, and 302Y are not driven. This can decrease wear of the photoconductors and the other elements in the imaging units 302C, 302M, and 302Y.

(2) Construction of the Image Processing Unit 205

Figure 4:
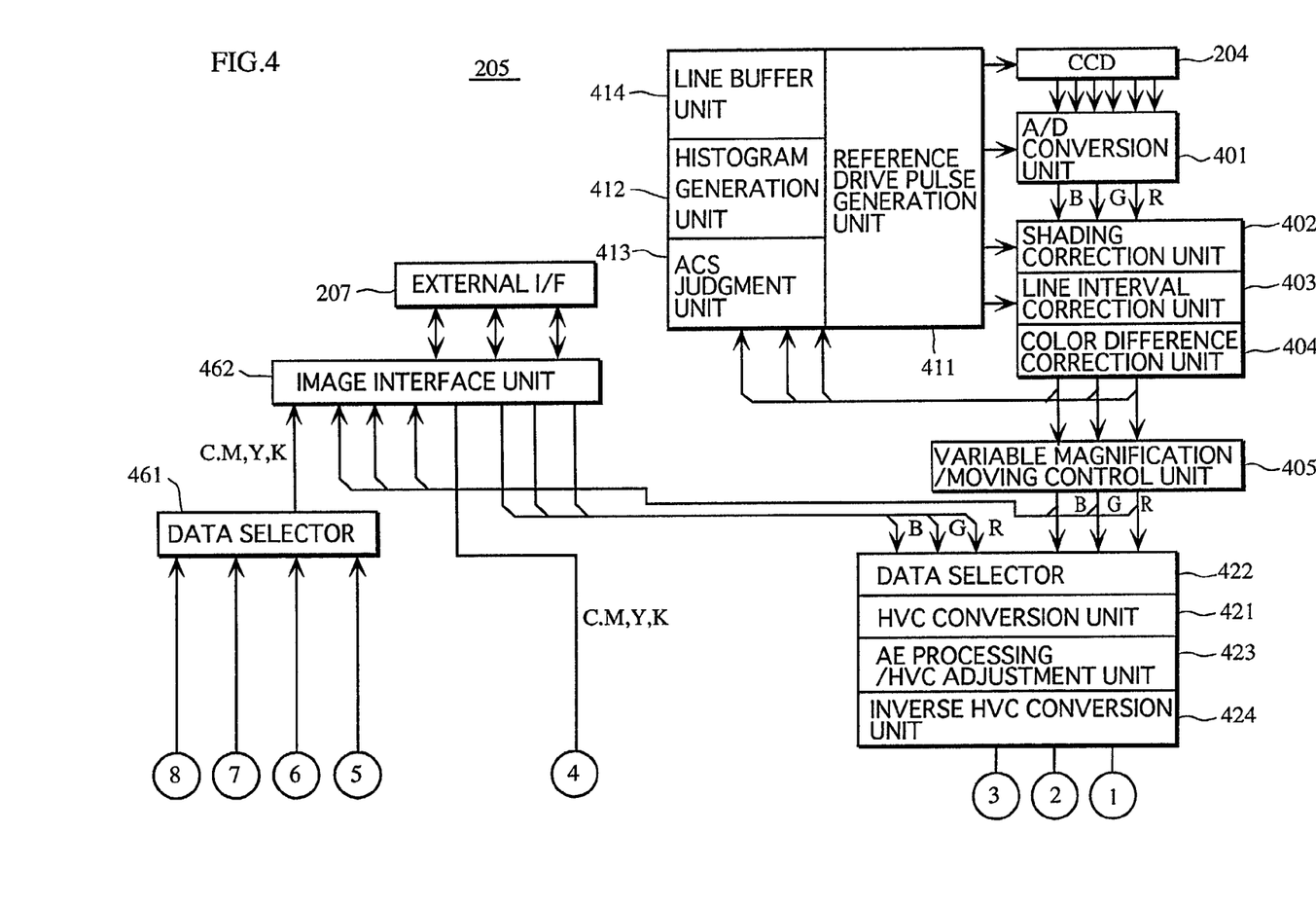
FIG. 4 is a functional block diagram showing the construction of an image processing unit 205.
Figure 5:
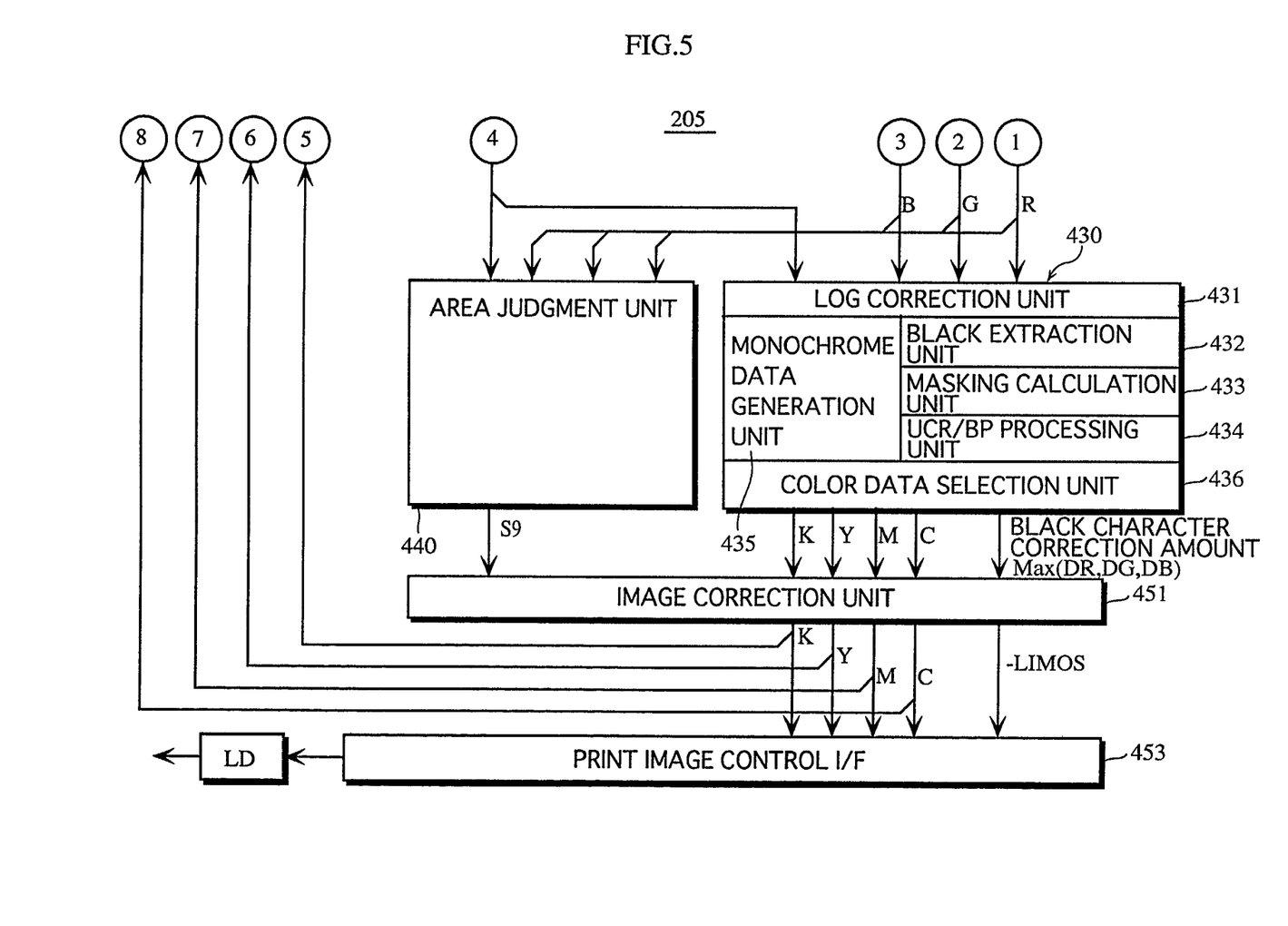
FIG. 5 is a functional block diagram showing the construction of the image processing unit 205.

The following describes the signal processing performed by the image processing unit 205 provided in the image reading unit 200. FIGS. 4 and 5 are functional block diagrams showing the construction of the image processing unit 205.

The CCD sensor 204 shown in FIG. 4 converts the document image into electric signals separated into respective colors of R, G, and B in accordance with the intensity of the light reflected from the surface of the document. The reading resolution of the CCD sensor 204 can be switched among 400 dpi, 600 dpi, 800 dpi, 1200 dpi, etc. An AD conversion unit 401 converts analogue signals outputted from the CCD sensor 204 into 8-bit digital data of 256 gradations for the R, G, and B information, based on a timing signal outputted from a reference drive pulse generation unit 411.

A shading correction unit 402 corrects the R, G, and B image data, to eliminate uneven light in the main scanning direction thereof. For the shading correction, data obtained by reading the shading correction plate 206 for each color is independently stored in an internal shading memory as reference data. To be more specific, the correction can be accomplished by converting reciprocally the reference data and multiplying the reciprocally converted data and the image data together when the document is scanned.

A line interval correction unit 403 aligns the reading position in the scanning direction of sensor chips of respective colors, R, G, and B, by delaying the image data of each color in line units using the internal field memory, in accordance with the scanning speed.

Due to the color difference phenomenon caused by an optical lens, the R, G, and B reading phase difference increases more as closer to the edge part of the document on the main scanning side. This may cause not only color aberration but also a misjudgment in an ACS judgment that is described later. In view of this, a color difference correction unit 404 corrects the R, G, and B phase difference based on chroma information.

A variable magnification/moving control unit 405 performs magnification/moving processing in the main scanning direction by using two magnification line memories for each of the R, G, and B image data and alternately inputting and outputting each one line while independently controlling the read/write timing. To be more specific, the variable magnification/moving control unit 405 accomplishes reduction by culling data when writing it to memory, and enlargement by diluting data when reading it from memory. In these controls, to prevent image loss and to decrease image coarseness, the variable magnification/moving control unit 405 performs an interpolation process on the data before writing it to memory for reduction and after reading it from memory for enlargement. These block control and scan control are combined not only for reduction and enlargement, but also for centering, image repeat, bound reduction, and the like.

A histogram generation unit 412 generates brightness data from the R, G, and B image data obtained by a preliminary scan, prior to operation for copying the document. The histogram generation unit 412 then generates a histogram of the brightness data in memory. An automatic color selection (ACS) judgment unit 413 judges whether each dot is a color dot or not with reference to the chroma data. The ACS judgment unit 413 then generates, in memory, information showing the number of color dots in each 512*512 dot square mesh on a document. Based on the generated information, the ACS judgment unit 413 performs a copy background level automatic control (AE process) and a color or monochrome copy operation automatic color selection (ACS process).

A line buffer unit 414 has a memory that can store one line of the R, G, and B image data read by the image reading unit 200. The line buffer unit 414 monitors image data used for image analysis for automatic sensitivity correction of the CCD sensor 204 and automatic clamp correction of the AD conversion unit 401.

An HVC conversion unit 421 once converts the R, G, and B image data inputted via a data selector 422, into brightness (V data) and color difference signals (Cr and Cb data) via 3*3 matrix calculation.

Next, an AE processing unit 423 corrects the V data based on the above mentioned background level control value, and the Cr and Cb data in accordance with the chroma level and the hue level set on the control panel. Following this, an inverse HVC conversion unit 424 converts the V data and the Cr and Cb data back into the R, G, and B image data via 3*3 inverse matrix calculation.

In a color correction unit 430 shown in FIG. 5, a LOG correction unit 431 first converts the R, G, and B data into density data (DR, DG, and DB data), and then a black extraction unit 432 detects the smallest color level of the DR, DG, and DB data as document background components, and also detects the gradient level difference between the maximum color and minimum color of DR, DG, and DB as document chroma data.

A masking calculation unit 433 then performs a 3*6 nonlinear matrix calculation process on the DR, DG, and DB data, to convert the data into color data (C, M, Y, and K data) matching the color toner of the printer.

A UCR/BP processing unit 434 calculates the UCR/BP coefficients corresponding to the document chroma data for the document background components (Min(R,G,B)), and determines the UCR/BP amount by a multiple process. The UCR/BP processing unit 434 then subtracts an amount of under color removal (UCR) from the C, M, and Y data after the masking calculation, and calculates the C, M, and Y data and the K data (BP amount). Also, a monochrome data generation unit 435 generates the brightness component from the R, G, and B data and performs the LOG correction on the brightness component, to output the black data (DV data). Finally, a color data selection unit 436 selects the C, M, Y, and K data for a color copy image, and the DV data (C, M, and Y are white) for a monochrome copy image.

An area judgment unit 440 judges, based on the R, G, and B image data inputted via the data selector 422, whether each pixel included in the image data is in a halftone-dot area and the like or not, and outputs an area judgment signal S9 indicating the judgment result. The construction of the area judgment unit 440 is described in detail later.

An image correction unit 451 performs image correction processing such as smoothing on the C, M, Y, and K image data outputted from the color correction unit 430 as necessary, in accordance with the area judgment signal S9 outputted from the area judgment unit 440. The image correction unit 451 then performs image correction processing on the C, M, Y, and K data in accordance with sharpness, color balance, and gamma level designated on the control panel. Then, the image correction unit 451 transmits the gradation reproduction attribute signals (-LIMOS) to a print image control interface 453. Also, the image correction unit 451 transmits the C, M, Y, and K data to an image interface unit 462 via a data selector 461 shown in FIG. 4.

The image interface unit 462 inputs and outputs image data, to and from an external device. The image interface unit 462 enables the R, G, and B data to be inputted and outputted at the same time and also, the C, M, Y, and K data to be inputted and outputted sequentially. The image interface unit 462 thereby enables the external device to utilize the scanner function and the printer function of the copying machine 1.

(3) Construction of the Area Judgment Unit 440

Figure 6:
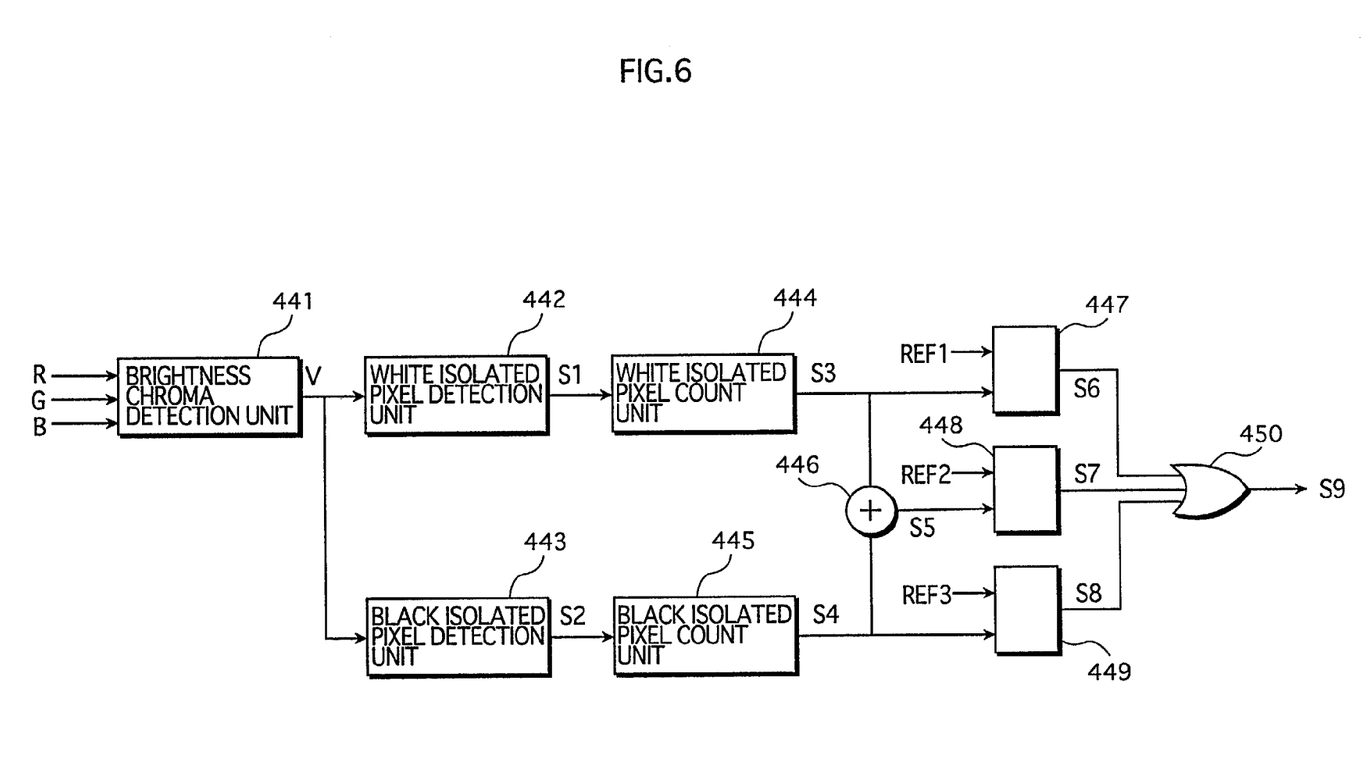
FIG. 6 shows the construction of an area judgment unit 440 in a first embodiment of the present invention.

FIG. 6 schematically shows the construction of the area judgment unit 440. As described above, the area judgment unit 440 judges whether a pixel whose area is to be judged (hereafter referred to as a "target pixel") is in a half tone-dot area and the like or not, based on the R, G, and B image data, and outputs the area judgment signal S9 to the image correction unit 451. It should be noted that the figure only shows components relating to a judgment as to whether the target pixel is in a halftone-dot area, and does not show components that are not related to the present invention (for example, components that realize other judgments such as judgments of an edge area of a character and a color area). An area judgment signal S9 is hereafter referred to as a halftone-dot judgment signal S9. The image correction unit 451 performs image correction processing such as smoothing on the C, M, Y, and K data outputted from the color correction unit 430 as necessary, in accordance with the halftone-dot judgment signal S9. Smoothing is one example of image correction processing suitable for pixels that are judged to be in a halftone-dot area.

The area judgment unit 440 includes a brightness chroma detection unit 441, a white isolated pixel detection unit 442, a black isolated pixel detection unit 443, a white isolated pixel count unit 444, a black isolated pixel count unit 445, an addition unit 446, comparison units 447 to 449, and an OR circuit 450. A halftone-dot judgment signal S9 is eventually outputted from the OR circuit 450. The following describes the operations of each unit included in the area judgment unit 440 in detail.

The brightness chroma detection unit 441 subjects the R, G, and B image data (reflected light data) to color space conversion, so as to generate chroma data and brightness data "V". It should be noted that chroma data is not described in detail in the present embodiment.

Figure 7:
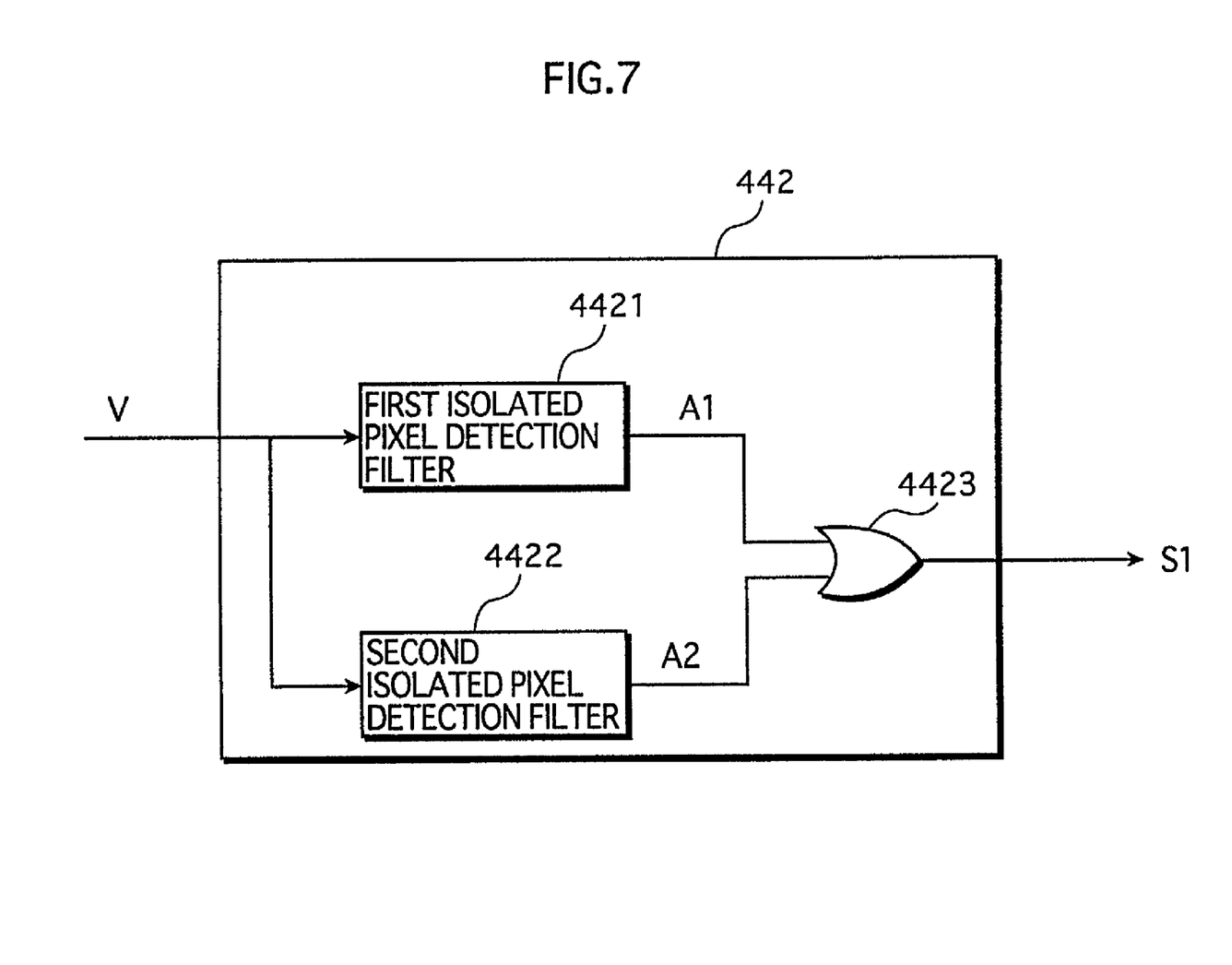
FIG. 7 shows the construction of a white isolated pixel detection unit 442 in the first embodiment.

The white isolated pixel detection unit 442 judges whether a target pixel is a white isolated pixel, by referring to comparison results of (a) brightness data of the target pixel and (b) brightness data of nearby pixels, using an isolated pixel detection filter with a predetermined size including the target pixel as the center. FIG. 7 shows the construction of the white isolated pixel detection unit 442 in detail, which is the same as the construction of the black isolated pixel detection unit 443.

As FIG. 7 shows, the white isolated pixel detection unit 442 includes a first isolated pixel detection filter 4421 and a second isolated pixel detection filter 4422. The first isolated pixel detection filter 4421 has a size of 5*5 pixels, and the second isolated pixel detection filter 4422 has a size of 7*7 pixels. In the present embodiment, a filter that is used as the first isolated pixel detection filter 4421 is the same as the filter shown as a conventional technique in FIG. 1.

Here, the following describes in detail an example of the operation of the first isolated pixel detection filter 4421 when the isolated pixel detection filter with a size of 5*5 pixels shown in FIG. 1 is used. Here, a pixel "V33" in FIG. 1 is set as a target pixel, and a judgment is performed as to whether the target pixel "V33" is a white isolated pixel. The judgment is specifically performed using brightness data "L33" of the target pixel "V33", brightness data "L11" to "L15", and "L21" to "L25" etc., of nearby pixels "V11" to "V15" and "V21" to "V25" etc., based on whether one of the following conditions: inequality 1; inequality 2; and inequality 3, is satisfied or not.

$L33 > \mathrm{MAX}\ (L22, L23, L24, L34, L44, L43, L42, L32)$  Inequality 1

$L33 > \mathrm{MAX}\ (L11, L12, L13, L14, L15, L25, L35, L45, L55, L54, L53, L52, L51, L41, L31, L21)$  Inequality 2

$L33 > \mathrm{MAX}\ \{(L11+L22)/2, (L13+L23)/2, (L15+L24)/2, (L55+L44)/2, (L53+L43)/2, (L51+L42)/2\}$  Inequality 3

Note here that a "white isolated pixel" is a pixel with high brightness that stands isolated in a background of pixels with low brightness. To judge whether the target pixel is a black isolated pixel (a pixel with low brightness that stands isolated in a background of pixels with high brightness), the above inequalities 1, 2, and 3, in each of which a sign of inequality is inversed and MAX (maximum value) is replaced by MIN (minimum value) can be used. It should be noted here that one or more isolated pixels can construct one dot in a halftone-dot area.

The target pixel is judged to be an isolated pixel when at least one of the above inequalities 1, 2, and 3 is satisfied. By doing so, the first isolated pixel detection filter 4421 can deal with halftone-dot areas with various resolution, such as a halftone-dot area in which one halftone-dot consists of one pixel; a halftone-dot area in which one halftone-dot consists of four pixels (2*2 pixels); and a halftone-dot area in which one halftone-dot consists of nine pixels or the like in case brightness of each pixel constituting a halftone-dot is not uniform.

Figure 8:
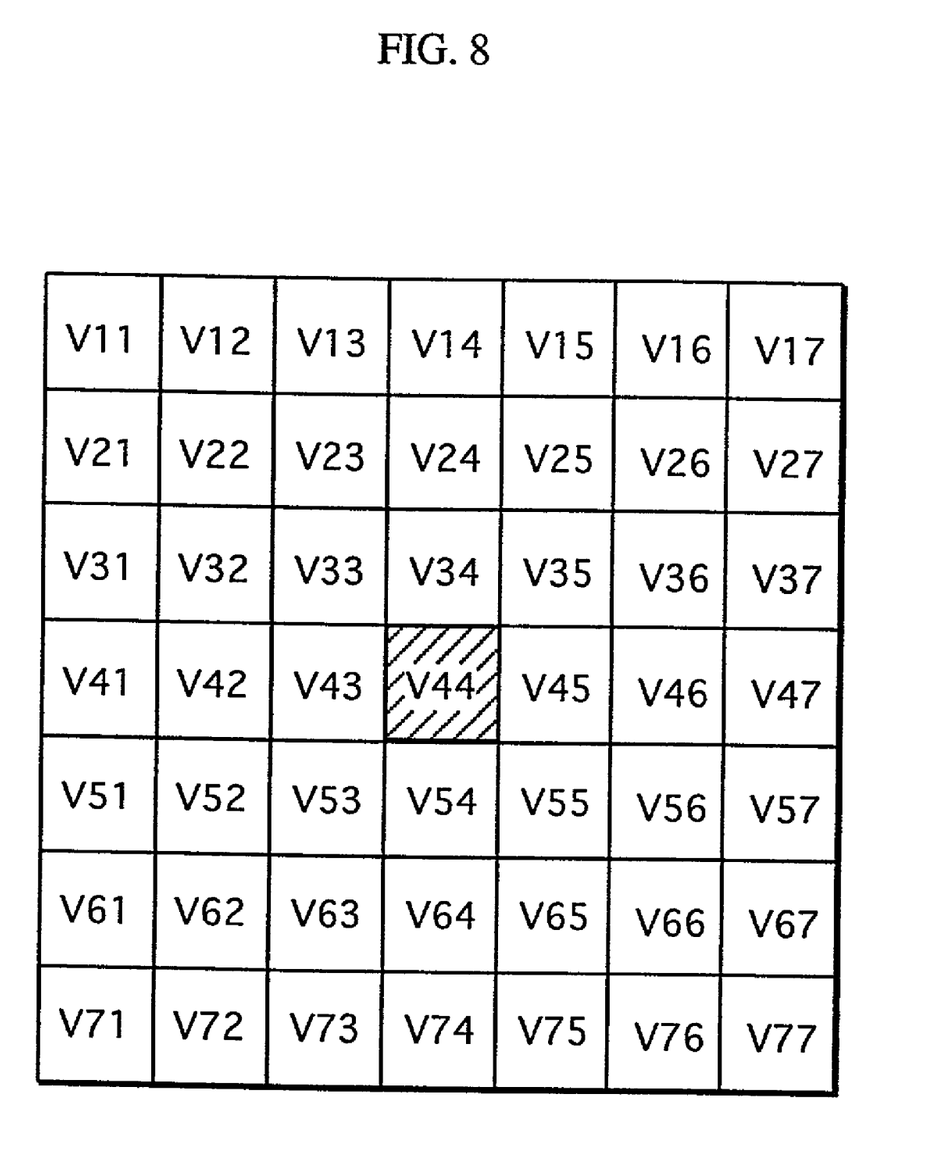
FIG. 8 shows an isolated pixel detection filter with a size of 7*7 pixels used in a second isolated pixel detection filter 4422.

The following describes the second isolated pixel detection filter 4422. FIG. 8 shows an example of a filter used in the second isolated pixel detection filter 4422. In the present embodiment, as one example of a filter that differs in size from a filter used in the first isolated pixel detection filter 4421, an isolated pixel detection filter with a size of 7*7 pixels is used.

Here, a pixel "V44" in FIG. 8 is set as a target pixel, and a judgment is performed as to whether the target pixel "V44" is a white isolated pixel. The judgment is specifically performed using brightness data "L44" of the target pixel "V44", brightness data "L11" to "L17", and "L21" to "L27" etc., of nearby pixels "V11" to "V17" and "V21" to "V27" etc., based on whether one of the following conditions: inequality 4; and inequality 5, is satisfied or not.

$L44 > \mathrm{MAX}\ (L11, L12, L13, L14, L15, L16, L17, L27, L37, L47, L57, L67, L77, L76, L75, L74, L73, L72, L71, L61, L51, L41, L31, L21)$  Inequality 4

$L44 > \mathrm{MAX}\ \{(L11+L22)/2, (L12+L13+L23)/3, (L14+L24)/2, (L15+L16+L26)/3, (L26+L17)/2, (L36+L37+L27)/3, (L46+L47)/2, (L56+L57+L67)/3, (L66+L67)/2, (L65+L75+L76)/3, (L64+L74)/2, (L63+L72+L73)/3, (L62+L71)/2, (L51+L52+L61)/3, (L41+L42)/2, (L21+L31+L32)/3\}$  Inequality 5

For the black isolated pixel detection unit 443 to judge whether the target pixel is a black isolated pixel, the above inequalities 4 and 5, in each of which a sign of inequality is inversed and MAX (maximum value) is replaced by MIN (minimum value) can be used.

The target pixel is judged to be an isolated pixel when one of the above inequalities 4 and 5 is satisfied. By doing so, an isolated pixel can be detected in halftone-dot areas with various resolution, such as a halftone-dot area in which one halftone-dot consists of 16 pixels (4*4 pixels), and a halftone-dot area in which one halftone-dot consists of 25 pixels or the like. The second isolated pixel detection filter 4422, therefore, can deal with a halftone-dot area in which a halftone-dot is larger than that in a halftone-dot area dealt with by the first isolated pixel detection filter 4421 (a halftone-dot area with lower-resolution).

In the white isolated pixel detection unit 442, an output signal A1 of the first isolated pixel detection filter 4421 and an output signal A2 of the second isolated pixel detection filter 4422 are inputted into the OR circuit 4423, and eventually, a signal S1 is outputted. In this way, a white isolated pixel signal S1 being "high", indicating that the target pixel is a white isolated pixel, is outputted when the first isolated pixel detection filter 4421 or the second isolated pixel detection filter 4422 judges that the target pixel is a white isolated pixel. This concept is also applicable to the black isolated pixel detection unit 443. To be more specific, when either of the two isolated pixel detection filters with difference sizes judges that the target pixel is a black isolated pixel, the black isolated pixel signal S2 being "high" is outputted. It should be noted that the first isolated pixel detection filter 4421 and the second isolated pixel detection filter 4422 may not be physically different. In short, brightness data may be stored in one storage unit and different ranges of the brightness data may be read to detect isolated pixels.

The following describes the white isolated pixel count unit 444 and the black isolated pixel count unit 445. The white isolated pixel count unit 444 and the black isolated pixel count unit 445 have the same construction. The white isolated pixel count unit 444 (or the black isolated pixel count unit 445) counts the number of pixels judged to be white isolated pixels (or black isolated pixels) in a predetermined area for example consisting of 9 (vertical)*45 (horizontal) pixels, by referring to a white isolated pixel signal S1 (or a black isolated pixel signal S2). Then, the white isolated pixel count unit 444 (or the black isolated pixel count unit 445) outputs a white isolated pixel count signal S3 (or a black isolated pixel count signal S4) that indicates a count result.

The output white isolated pixel count signal S3 is inputted into the addition unit 446 and the comparison unit 447. The comparison unit 447 compares the count result with a predetermined threshold REF1, and outputs a signal S6 set at "high", indicating that the target pixel is in a halftone-dot area, when the count number of white isolated pixels is above the threshold REF1.

On the other hand, the black isolated pixel count signal S4 outputted from the black isolated pixel count unit 445 is inputted into the addition unit 446 and the comparison unit 449. The comparison unit 449 compares the count result of black isolated pixels with a predetermined threshold REF3, and outputs a signal S8 set at "high", indicating that the target pixel is in a halftone-dot area, when the count number of black isolated pixels is above the threshold REF3.

The addition unit 446 adds the count number of white isolated pixels and the count number of black isolated pixels together, and outputs a signal S5. The signal S5 is inputted into the comparison unit 448, and is compared with a predetermined threshold REF2.

Such processing for adding the count number of white isolated pixels and the count number of black isolated pixels together, and comparing the resulting value with a predetermined threshold is not described in detail here because it is well known and disclosed in detail in the Japanese published unexamined application H11-266360. However, this addition processing can improve detection accuracy of a halftone-dot area that is with neither extremely low-resolution nor extremely high-resolution, that is, a halftone-dot area with intermediate resolution. The comparison unit 448 compares the value resulting from adding the number of white isolated pixels and the number of black isolated pixels, with a threshold REF2, and outputs a signal S7 set at "high" when the resulting value is above the threshold REF2. The OR circuit 450 takes a logical OR of the signals S6 to S8, and eventually outputs a halftone-dot judgment signal S9. The halftone-dot judgment signal S9 being "high" indicates that the target pixel is in a halftone-dot area. It should be noted here that the processing for adding the number of white isolated pixels and the number of black isolated pixels together by the addition unit 446 and comparing the resulting value with a predetermined threshold may not be performed.

Figure 9:
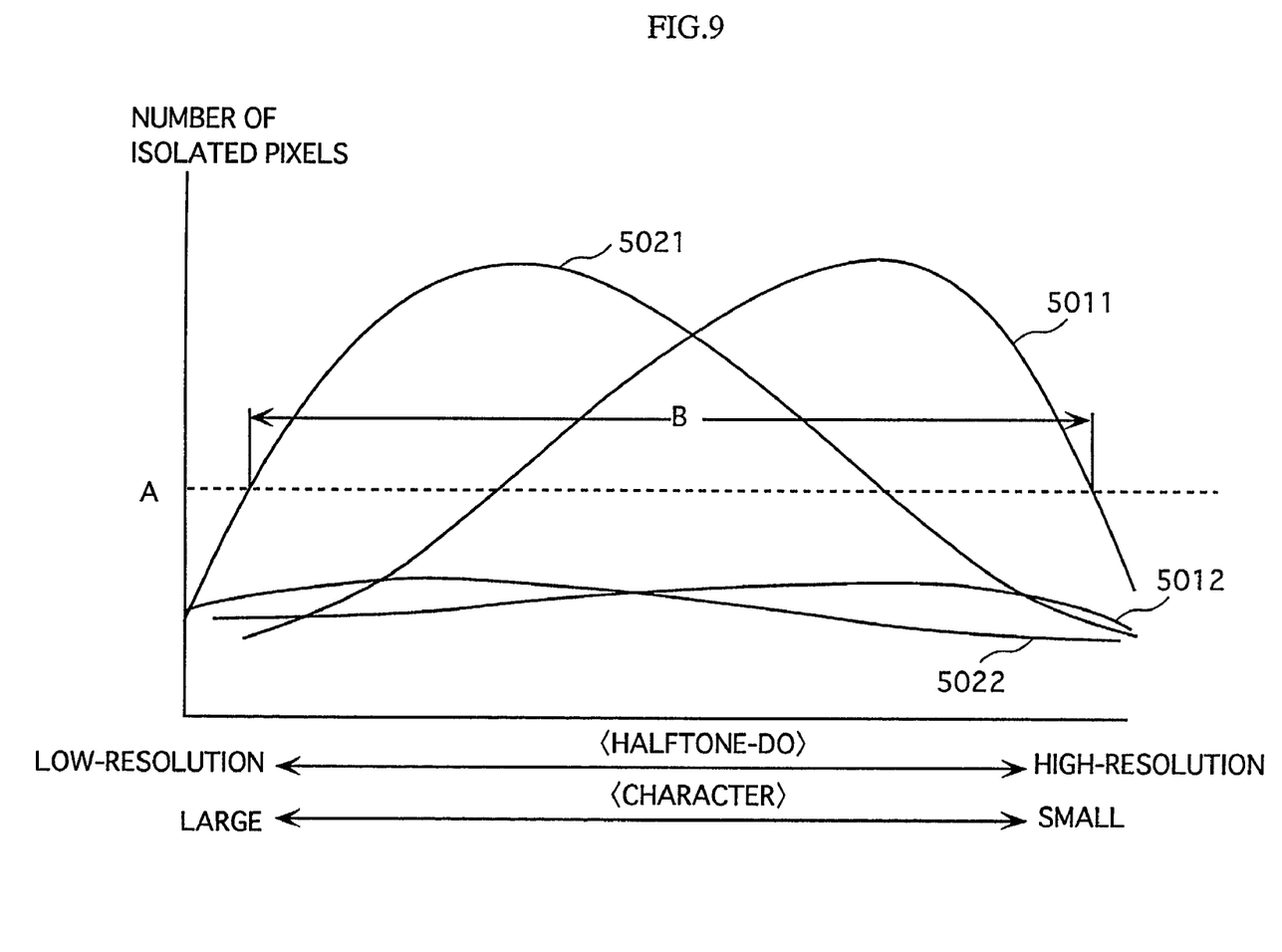
FIG. 9 shows the relationship between resolution of a halftone-dot area, a size of a character, and the number of isolated pixels to be detected using an isolated pixel detection filter in the first embodiment.

Here, the following describes advantages of (a) providing two isolated pixel detection units like the first isolated pixel detection filter 4421 and the second isolated pixel detection filter 4422, which each can detect a halftone-dot area in which a halftone-dot consists of a different number of isolated pixels, (b) taking a logical OR of outputs of the two units, and (c) outputting the result as an isolated pixel signal S1. FIG. 9 is a drawing for explaining the advantages.

In the figure, the horizontal axis indicates resolution of a halftone-dot area, or a size of a character, and the vertical axis indicates the number of isolated pixels to be detected as in FIG. 2. A curve 5011 indicates the number of isolated pixels to be detected (in the case of a halftone-dot area) by the first isolated pixel detection filter 4421, and a curve 5012 indicates the number of isolated pixels to be detected (in the case of a character) by the first isolated pixel detection filter 4421.

Also, a curve 5021 indicates the number of isolated pixels to be detected (in the case of a halftone-dot area) by the second isolated pixel detection filter 4422, and a curve 5022 indicates the number of isolated pixels to be detected (in the case of a character) by the second isolated pixel detection filter 4422.

As shown in the figure, the number of isolated pixels to be detected by the second isolated pixel detection filter 4422 peaks where a halftone-dot area has lower-resolution, as compared with the first isolated pixel detection filter 4421. Therefore, the value "A" set as a threshold for judging whether the target pixel is in a halftone-dot area as in FIG. 2 enables correct halftone-dot area judgment in a range "B" in FIG. 9. Thus, the use of two different isolated pixel detection filters enables correct halftone-dot area judgment to be realized in a broader range, as compared with the case shown in FIG. 2 where a single isolated pixel detection filter is used.

It should be noted here that the halftone-dot judgment signal S9 is inputted into the image correction unit 451, where smoothing is specifically performed when the target pixel is judged to be in a halftone-dot area. The operation of smoothing is not described here as it is well known.

Second Embodiment

The following describes a second embodiment of the present invention. The present embodiment describes a method for decreasing misjudgment of a halftone-dot area when a character image is present in the halftone-dot area.

Figure 10:
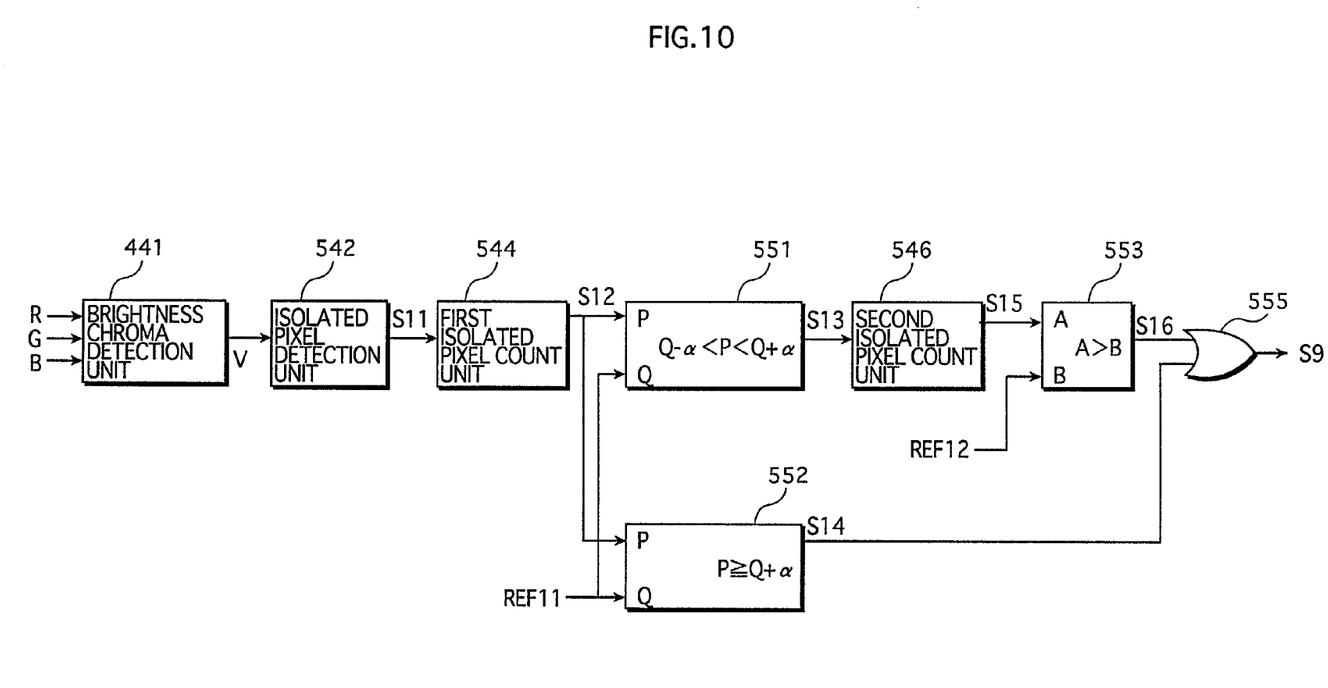
FIG. 10 shows an example of the construction of an area judgment unit 440 in a second embodiment of the present invention.

FIG. 10 shows the construction of a part of an area judgment unit 440 of the present invention, the part relating to a judgment of a halftone-dot area. A brightness chroma detection unit 441 generates brightness data "V" based on the R, G, and B image data as in the first embodiment. It should be noted that an isolated pixel detection filter and an isolated pixel count unit may be provided for each of a white isolated pixel and a black isolated pixel as in the first embodiment, but the figure only shows an isolated pixel detection filter and an isolated pixel count unit provided for a white isolated pixel.

An isolated pixel detection unit 542 uses the isolated pixel detection filter shown in FIG. 1, and judges whether each pixel is an isolated pixel, based on the brightness data "V". The isolated pixel detection filter should not be limited to the one shown in FIG. 1, but an isolated pixel detection filter with a different size like the one shown in FIG. 8 may be used, or a plurality of isolated pixel detection filters with different sizes may be used as in the first embodiment.

The isolated pixel signal S11 is inputted into a first isolated pixel count unit 544. In the present embodiment, the first isolated pixel count unit 544 counts the number of isolated pixels in an isolated pixel count filter consisting for example of 9*9 pixels with a target pixel as the center, and outputs an isolated pixel count signal S12. In the example of the figure, the isolated pixel count signal S12 is assumed to include the content of the isolated pixel signal S11.

The isolated pixel count signal S12 is inputted into the comparison unit 551 and the comparison unit 552. On the other hand, a first threshold REF11 for judging whether the target pixel is in a halftone-dot area by referring to the count result of the first isolated pixel count unit 544 is inputted into the comparison unit 551 and the comparison unit 552.

The comparison unit 551 is constructed by a comparator, a selector, etc. The comparison unit 551 compares the count result "P" of the first isolated pixel count unit 544 with the threshold REF11 "Q", and outputs the content of the isolated pixel signal S11 included in the isolated pixel count signal S12 as a signal S13, only when the relationship between values "P" and "Q" satisfies the following inequality 6.

$$Q-\alpha<P<Q+\alpha \qquad \text{Inequality 6}$$

Here, "α" represents a predetermined constant. When the above inequality 6 is satisfied, the output S13 of the comparison unit 551 is inputted into a second isolated pixel count unit 546. On the other hand, the comparison unit 552 outputs an output signal S14 set at "high" when the relationship between the values "P" and "Q" satisfies the following inequality 7. The signal S14 being "high" indicates that the target pixel is tentatively judged to be in a halftone-dot area.

$$P \geq Q+\alpha \qquad \text{Inequality 7}$$

The second isolated pixel count unit 546 sets a filter with a smaller size than the isolated pixel count filter used in the first isolated pixel count unit 544, by referring to the output signal S13 of the comparison unit 551. For example, the second isolated pixel count unit 546 sets an isolated pixel count filter with a size of 5*5 pixels, and counts the number of isolated pixels present in the filter area. The count result of the second isolated pixel count unit 546 is inputted into the comparison unit 553 as an isolated pixel count signal S15.

The comparison unit 553 compares the number of isolated pixels counted by the second isolated pixel count unit 546 with a second threshold REF12, and sets the output signal S16 at "high" when the count number of isolated pixels is above the threshold REF12. The signal S16 being "high" also indicates that the target pixel is tentatively judged to be in a halftone-dot area.

The signal S16 and the signal S14 are inputted into the OR circuit 555. When one of the signal S16 and the signal S14 is "high", the halftone-dot judgment signal S9 is set at "high", eventually indicating that the target pixel is in a halftone-dot area, and is outputted. The halftone-dot judgment signal S9 is handled in the same way as in the first embodiment.

Figure 11A:
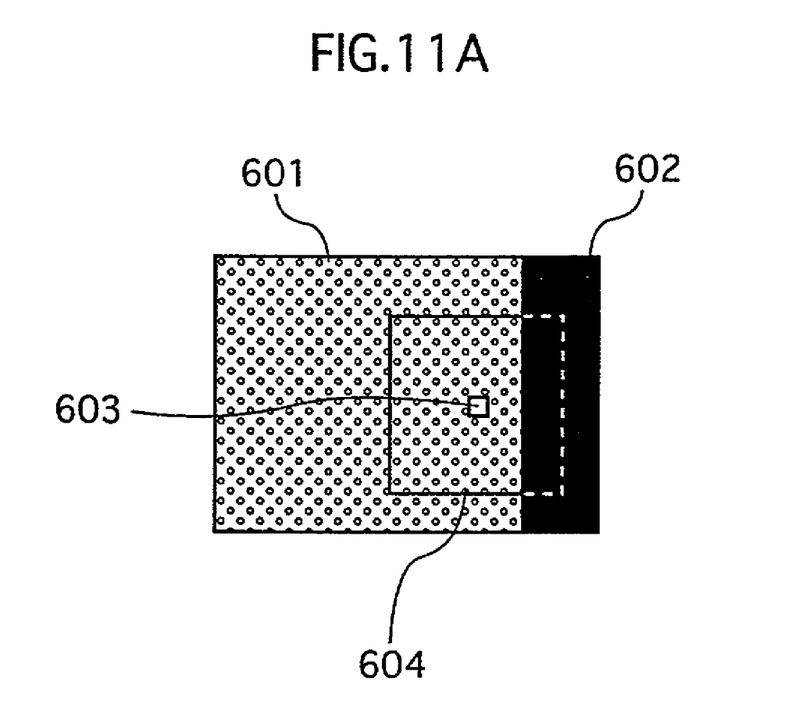
FIGS. 11A and 11B are drawings for explaining why an isolate pixel count process in the second embodiment can decrease misjudgment.
Figure 11B:
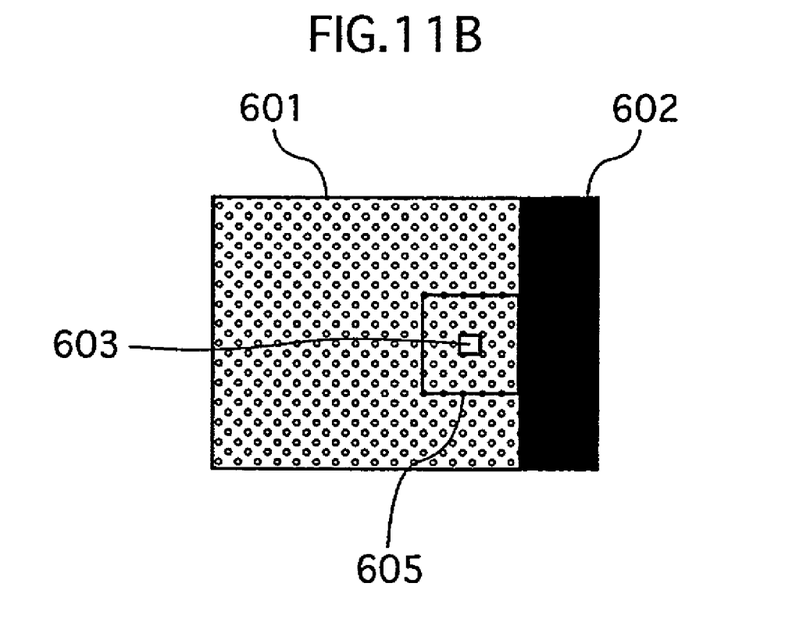

The following briefly explains why misjudgment can be decreased by providing a plurality of isolated pixel count units as described above. FIGS. 11A and 11B are drawings for explaining a difference in the count number of isolated pixels between (1) in a case where a size of an isolated pixel count filter used in the isolated pixel count unit is large (FIG. 11A) and (2) in a case where a size of an isolated pixel count filter is small (FIG. 11B).

In FIGS. 11A and 11B, it is assumed that a target pixel 603 is present in a halftone-dot area that is in a close vicinity of a boundary between a halftone-dot area 601 and a character area 602. FIG. 11A shows an example case where a filter 604 with a size of 9*9 pixels including the target pixel 603 as the center is used as an isolated pixel count filter and the number of isolated pixels in the filter 604 is counted. FIG. 11B shows an example case where a filter 605 with a size of 5*5 pixels is used and the number of isolated pixels in the filter 605 is counted.

In the example of FIG. 11A, a part of the character area 602 is included in the filter 604. In general, pixels in the character area 602 are not judged to be isolated pixels. When the number of isolated pixels in the filter 604 is counted, therefore, the count number can be below a threshold for a judgment of a halftone-dot area. This may results in misjudgment that the target pixel 603 is not in a halftone-dot area.

In view of this, when the count number of isolated pixels is in a predetermined range satisfying the above inequality 6, a size of the isolated pixel count filter is reduced, and the number of isolated pixels in the isolated pixel count filter with a reduced size is re-counted. To be more specific, the filter 605 is used as shown in FIG. 11B, so that the character area is not included in the filter anymore. In this way, the above misjudgment can be avoided.

(Modifications)

Although the present invention has been described based on the above two embodiments, the present invention should not be limited to these specific examples. For example, the following modifications are available.

(1) Although the first embodiment describes the case where a plurality of isolated pixel detection filters with different sizes are used and a judgment is performed as to whether a target pixel is an isolated pixel, based on whether the inequalities 1 to 5 are satisfied, the inequalities used in this judgment should not be limited to such. Other inequalities may also be used.

(2) Although the second embodiment describes the case where the filter 604 with a size of 9*9 pixels and the filter 605 with 5*5 pixels are used as filters for counting the number of isolated pixels, a filter size should not be limited to such. Filters with other sizes may also be used.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus, comprising:
   an acquisition unit for acquiring image data that includes a plurality of pixels, each of which is set as a target pixel to be judged;
   an isolated pixel judgment unit for judging, based on the image data, whether the target pixel is an isolated pixel for a judgment of a halftone-dot area;
   an isolated pixel counter for counting a number of isolated pixels in a predetermined area; and
   a halftone-dot area judgment unit for judging whether the target pixel is in a halftone-dot area, by comparing the count number of isolated pixels with a predetermined threshold,
   wherein the isolated pixel judgment unit includes:
   a first judgment subunit for judging whether the target pixel is an isolated pixel for a judgment of a halftone-dot area whose dot size is within a first range; and
   a second judgment subunit for judging whether the target pixel is an isolated pixel for a judgment of a halftone-dot area whose dot size is within a second range, and
   the isolated pixel judgment unit judges that the target pixel is an isolated pixel, when a judgment result of at least one of the first judgment subunit and the second judgment subunit is affirmative.

2. The image processing apparatus of claim 1,
   wherein a minimum of the second range is above a minimum of the first range, and is or below a maximum of the first range, and
   a maximum of the second range is above the maximum of the first range.

3. The image processing apparatus of claim 1,
   wherein the first judgment subunit judges whether the target pixel is an isolated pixel, based on image data corresponding to pixels positioned in a first area with respect to the target pixel, and
   the second judgment subunit judges whether the target pixel is an isolated pixel, based on image data corresponding to pixels positioned in a second area with respect to the target pixel, the second area being larger than the first area.

4. The image processing apparatus of claim 1,
   wherein the first judgment subunit includes an isolated pixel detection filter with a first size, and
   the second judgment subunit includes an isolated pixel detection filter with a second size that is larger than the first size.

5. The image processing apparatus of claim 1, further comprising
   an image correction unit for correcting the image data in accordance with a judgment result of the halftone-dot area judgment unit.

6. The image processing apparatus of claim 1,
   wherein the isolated pixel judgment unit includes:
   a white isolated pixel judgment subunit for comparing the target pixel and pixels at predetermined positions, and judging that the target pixel is an isolated pixel when brightness of the target pixel is higher than brightness of the pixels at predetermined positions; and a black isolated pixel judgment subunit for comparing the target pixel and pixels at predetermined positions, and judging that the target pixel is an isolated pixel when brightness of the target pixel is lower than brightness of the pixels at predetermined positions.

7. An image forming apparatus, comprising:

an acquisition unit for acquiring image data that includes a plurality of pixels, each of which is set as a target pixel to be judged;

an isolated pixel judgment unit for judging, based on the image data, whether the target pixel is an isolated pixel for a judgment of a halftone-dot area;

an isolated pixel counter for counting a number of isolated pixels in a predetermined area;

a halftone-dot area judgment unit for judging whether the target pixel is in a halftone-dot area, by comparing the count number of isolated pixels with a predetermined threshold;

an image correction unit for correcting the image data in accordance with a judgment result of the halftone-dot area judgment unit; and an image forming unit for forming an image, based on the image data corrected by the image correction unit, wherein the isolated pixel judgment unit includes:

a first judgment subunit for judging whether the target pixel is an isolated pixel for a judgment of a halftone-dot area whose dot size is within a first range;

a second judgment subunit for judging whether the target pixel is an isolated pixel for a judgment of a halftone-dot area whose dot size is within a second range, and the isolated pixel judgment unit judges that the target pixel is an isolated pixel, when a judgment result of at least one of the first judgment subunit and the second judgment subunit is affirmative.

8. An image processing method, comprising the steps of:

judging, based on input image data, whether a target pixel is an isolated pixel, by using a detection filter with a first size;

judging, based on the input image data, whether the target pixel is an isolated pixel, by using a detection filter with a second size that is larger than the first size;

judging that the target pixel is an isolated pixel, when the target pixel is judged to be an isolated pixels in at least one of aforementioned judgment steps;

counting a number of isolated pixels in a predetermined area; and judging whether the target pixel is in a halftone-dot area, by comparing the count number of isolated pixels with a predetermined threshold.

9. An image processing apparatus, comprising:

an acquisition unit for acquiring image data that includes a plurality of pixels, each of which is set as a target pixel to be judged;

an isolated pixel judgment unit for judging, based on the image data, whether the target pixel is an isolated pixel for a judgment of a halftone-dot area;

a first isolated pixel counter for counting a number of isolated pixels in a first area;

a second isolated pixel counter for counting a number of isolated pixels in a second area that is smaller than the first area; and a halftone-dot area judgment unit for (a) judging whether the target pixel is in a halftone-dot area by comparing the number of isolated pixels counted by the second isolated pixel counter with a first threshold, in a first case where the number of isolated pixels counted by the first isolated pixel is within a predetermined range, and (b) judging whether the target pixel is in a halftone-dot area by comparing the number of isolated pixels counted by the first isolated pixel counter with a second threshold, in a second case that is other than the first case.

10. The image processing apparatus of claim 9, further comprising an image correction unit for correcting the image data in accordance with a judgment result of the halftone-dot area judgment unit.

11. The image processing apparatus of claim 9, wherein the isolated pixel judgment unit includes:

a white isolated pixel judgment subunit for comparing the target pixel and pixels at predetermined positions, and judging that the target pixel is an isolated pixel when brightness of the target pixel is higher than brightness of the pixels at predetermined positions; and a black isolated pixel judgment subunit for comparing the target pixel and pixels at predetermined positions, and judging that the target pixel is an isolated pixel when brightness of the target pixel is lower than brightness of the pixels at predetermined positions.

12. An image forming apparatus, comprising:

an acquisition unit for acquiring image data that includes a plurality of pixels, each of which is set as a target pixel to be judged;

an isolated pixel judgment unit for judging, based on the image data, whether the target pixel is an isolated pixel for a judgment of a halftone-dot area;

a first isolated pixel counter for counting a number of isolated pixels in a first area;

a second isolated pixel counter for counting a number of isolated pixels in a second area that is smaller than the first area;

a halftone-dot area judgment unit for (a) judging whether the target pixel is in a halftone-dot area by comparing the number of isolated pixels counted by the second isolated pixel counter with a first threshold, in a first case where the number of isolated pixels counted by the first isolated pixel is within a predetermined range, and (b) judging whether the target pixel is in a halftone-dot area by comparing the number of isolated pixels counted by the first isolated pixel counter with a second threshold, in a second case that is other than the first case;

an image correction unit for correcting the image data in accordance with a judgment result of the halftone-dot area judgment unit; and an image forming unit for forming an image, based on the image data corrected by the image correction unit.

13. An image processing method, comprising the steps of:

judging, based on input image data, whether a target pixel is an isolated pixel for a judgment of a halftone-dot area;

counting a number of isolated pixels in a first area;

counting a number of isolated pixels in a second area that is smaller than the first area; and judging whether the target pixel is in a halftone-dot area, (a) by comparing the number of isolated pixels counted in the second isolated pixel count step with a first threshold, in a first case where the number of isolated pixels counted by the first isolated pixel is within a predetermined range, and (b) by comparing the number of isolated pixels counted in the first isolated pixel count step with a second threshold, in a second case that is other than the first case.

* * * * *